US005273724A

United States Patent [19]

Bos

[11] Patent Number: 5,273,724

[45] Date of Patent: Dec. 28, 1993

[54] CATALYTIC CONVERTER

[75] Inventor: Karel Bos, Brasschaat, Belgium

[73] Assignee: Scambia Industrial Developments Aktiengesellschaft, Schaan, Fed. Rep. of Germany

[21] Appl. No.: 815,275

[22] Filed: Dec. 27, 1991

[30] Foreign Application Priority Data

Jan. 3, 1991 [CH] Switzerland ........................ 00004/91

[51] Int. Cl.$^5$ ........................ B01D 50/00; B01D 39/08

[52] U.S. Cl. .................................... 422/179; 422/177; 422/180; 55/496; 55/503; 55/509; 55/DIG. 30

[58] Field of Search ............... 422/171, 177, 179, 180; 55/DIG. 30, 496, 503, 509; 428/57

[56] References Cited

U.S. PATENT DOCUMENTS 4,043,761 8/1977 Gaysert et al. ...................... 422/179
4,148,120 4/1979 Siebels ................................ 422/122
4,160,010 7/1979 Öttle ................................... 422/180
4,215,093 7/1980 Yasuda ............................... 422/179
4,256,700 3/1981 Smith et al. ......................... 422/177
4,282,186 8/1981 Nonnemann et al. .............. 422/180
4,322,388 3/1982 Hardin et al. ........................ 422/177
4,335,078 6/1982 Ushijima et al. .................... 422/179
4,925,634 5/1990 Yokokoji et al. .................. 422/179

*Primary Examiner*—James C. Housel
*Assistant Examiner*—N. Bhat
*Attorney, Agent, or Firm*—Anderson, Kill Olick & Oshinsky

[57] ABSTRACT

The catalytic converter has a casing with two one-piece shells. These each have a curved section and flanges projecting outward away therefrom. The flanges are welded to one another in pairs and make an angle with one another at least in a substantial part of their lengths and, for example, over their entire lengths. In the production of the catalytic converter, the shells can be produced simply and economically with the aid of a shaping process. After at least one dimensionally stable core and an elastically deformable intermediate layer surrounding this core have been arranged between the two shells, the latter are pressed against one another with a predetermined compressive force and are welded to one another. In the mass production of catalytic converter, their cores can be installed readily and without damage in the casing, even in the case of relatively large deviations from the intended ideal shapes and ideal dimensions.

24 Claims, 2 Drawing Sheets

CATALYTIC CONVERTER

BACKGROUND OF THE INVENTION

1. Field of the Invention

The invention relates to a catalytic converter for the treatment of exhaust gas, and a process for the production of a catalytic converter. The catalytic converter is intended in particular for installation in the exhaust gas pipe of an internal combustion engine—for example of the gasoline engine of a road vehicle.

2. Description of the Prior Art A catalytic converter disclosed in British Patent publication 2 048 105 has an oblong metallic casing and two cores, which are arranged therein and each of which has a ceramic element having an approximately oval cross-section and passages for the exhaust gas, and a catalytically active coating. The casing has two shells with curved main sections, which together form a generally cylindrical lateral part of approximately, oval cross-section, and end walls which are connected to its two ends and are inclined toward the longitudinal axis of the catalytic converter and are provided with holes in the center. The shells have flanges which project outwardly away from their curved main sections and are welded to one another. These flanges are essentially parallel to a plane extending between the two shells, and rest against one another with flat surfaces in cross-sections at right angles to the weld seams. An intermediate layer is arranged between the inner surface of the casing and each core. The intermediate layer has a collar consisting of wire fabric and a collar of an elastic layer which inflates on heating.

The commercially available ceramic elements may have shapes differing greatly from the intended ideal shapes and may be, for example, more or less curved in the form of a banana instead of a cylinder. Furthermore, the actual dimensions may differ relatively greatly from the intended ideal dimensions. For the ideal cross-sectional dimensions of, typically, about 10 cm to 30 cm and the ideal lengths of about 30 cm to 60 cm, the deviations from the ideal dimensions are, for example, often more than 1 mm. In addition, the catalysts are usually heated to temperatures of about 750° C. to 950° C. during operation. This heating causes expansions, the metallic casing expanding to a substantially greater extent than the ceramic element.

Since the ceramic elements are brittle, they should be firmly held in the casing, both in the cold and in the warm state and also during the vibrations which occur during operation, but should not be subjected to excessive compressive forces. The above-mentioned intermediate layers of the catalytic converter are intended to compensate the deviations of the shape and of the dimensions from the ideal shape and the ideal dimensions, and also the different expansions of the metallic casing and of the ceramic element caused by heating. However, if the deviations are too great, they are frequently insufficiently compensated by the intermediate layer. If the ceramic elements are then subjected to an excessive compressive force by the casing, at least in localized areas, this can cause damage—such as cracks or fractures. If, on the other hand, the ceramic elements are held only loosely in the casing of a catalytic converter, for example, installed in a motor vehicle, they may be destroyed in a short time by the vibrations and impacts arising during use of the motor vehicle. Similar problems may also occur in the case of catalytic converters whose cores, instead of ceramic elements, have elements which consist of another material and restrict the passages for the exhaust gas to be treated. In the case of catalytic converters having casings whose shells have flanges parallel to a plane, there is therefore the danger that there will be a great deal of waste during production and/or that the catalytic converters will be damaged after being used for only a short time.

U.S. Pat. No. 4,925,634 discloses catalytic converters having casings whose shells, where edge sections are welded to one another in pairs, rest against one another at the surfaces which are at least approximately flat, and at right angles to a plane extending through the different edges. The casings contain a core and an intermediate layer arranged between it and the inner surface of the casing. In the production of a catalytic converters of this type, the core and the intermediate layer are placed between the two shells. The two shells are then inserted one into the other, pressed against one another with a predetermined compressive force and welded at their edge sections. Catalytic converters and production processes which are more or less similar are also disclosed in British Patent disclosure 2 047 557 and European Patent publication 0 278 455.

The shells for the casings of such catalytic converters are usually produced from originally flat pieces of sheet metal by deep drawing. However, it is practically impossible to produce, directly by deep drawing, shells having edge sections which are directly adjacent to their edges and have surfaces parallel to the displacement direction of the deep drawing die.

For the production of such shells, it is therefore necessary, for example, first to form shell-like workpieces during deep drawing, which workpieces have flanges projecting outwardly at right angles to the stated displacement direction. These flanges must subsequently be removed. Removal of the flanges requires at least one additional, relatively complicated cutting process and also results in loss of material. The production of shells having edge sections of the described type which can be inserted one into the other, is therefore relatively expensive.

In the case of catalytic converter whose shells have edge sections which are inserted one into the other and welded to one another in the manner described, they can be elastically deformed very slightly at the most, if at all. This also constitutes a certain disadvantage since the edge sections cannot contribute anything toward compensating the different changes, caused by temperature changes, in the cross-sectional dimensions of the cores and shells.

SUMMARY OF THE INVENTION

It is therefore an object of the present invention to overcome disadvantages of the known catalytic converter and of the known processes for the production of catalytic converter. Starting in particular from the catalytic converter disclosed in British Patent publication 2 048 105, it is intended, even in the case of large deviations of the shape and/or of the dimensions of the core or cores, having for example a ceramic element, from the intended ideal shape or the intended ideal dimensions, to make it possible for the core or cores to be firmly held in the casing without excessive compressive forces acting on it (them). Furthermore, catalytic converter should be simple and economical to manufacture.

This object is achieved according to one aspect of the present invention by a catalytic converter for the treatment of exhaust gas, in particular of an internal combustion engine, having a casing which has two one-piece metallic shells with curved sections and flanges projecting outwardly away from them and welded to one another by weld seams, wherein the flanges welded to one another are at an angle to one another at least along a substantial part of their length, when viewed in cross-sections taken at right angles to the weld seams, and approach one another on the outside toward the relevant weld seam.

According to a further aspect of the present invention, there is provided a process for the production of a catalytic converter for the treatment of exhaust gas, having a casing, having at least one core arranged therein and possessing passages for the exhaust gas, wherein two metallic shells serving for formation of the casing are produced, each of which has a curved section and flanges projecting outwardly away from said section, wherein the at least one core is surrounded by a deformable intermediate layer and is arranged, together therewith, between the two shells, wherein the two shells are pressed against one another so that the flanges of the shells rest in pairs one against the other and are at an angle to one another at least along a substantial part of their length, when viewed in cross sections taken at right angles to their edges, which angle is reduced by an at least partly elastic deformation of the shells when the latter are pressed against one another, wherein, when the shells are pressed against one another, the at least one intermediate layer is compressed, and wherein the flanges are welded to one another while being pressed against one another.

The two shells may have a casing lateral section which in general—i.e. apart from the flanges and from beads and/or ribs serving for rigidity—is parallel to an axis and cylindrical, and is has an approximately circular, or approximately elliptical, or approximately oval cross-sectional shape. The casing may furthermore have, at each of the two ends of its lateral part, an end wall which is formed by end wall sections of the two shells. The two end walls may form an angle with the axis and approach the axis away from the ends of the lateral part. The end walls may be straight or curved or partially straight or partially curved in axial sections. The casing may furthermore have two openings which serve as an inlet or outlet for the exhaust gas, are located at the centers of the end walls, and are coaxial with the axis.

The casing may contain at least one core having a lateral surface which is generally cylindrical and with an approximately circular, or elliptical, or oval cross-sectional shape and with passages for the exhaust gas. The generally cylindrical lateral part of the casing may extend approximately over the length of one core or of the totality of the cores. Moreover, a deformable intermediate layer may be arranged between the casing inner surfaces, formed by the shell inner surfaces and the or each core. If two or possibly even more cores spaced a distance apart are present, either one intermediate layer extending continuously over both or all cores may be provided or a separate intermediate layer may be provided for each core.

In the catalytic converter according to the invention, the flanges projecting outwardly from the curved sections of the shells and welded in pairs to one another from an angle with one another at least along a substantial part of their length, when viewed in cross-sections taken at right angles to the weld seams and to their edges. The meaning of the feature "at least along a substantial part of their length" will be explained below. Of the flanges welded to one another in pairs, at least those parts which are located in the preferably present, generally cylindrical lateral part or jacket of the casing and are at least generally parallel to the axis are intended to form an angle of the stated type. Accordingly, at least those parts of the flanges, which are welded to one another and extend over the length of the one or more cores in the direction parallel to the axis of the casing and along the general direction of flow of the exhaust gas and, thus, in the direction from one opening of the casing to its other opening, can then form an angle of the stated type. Furthermore, the entire parts of the flanges welded to one another, which parts are present in the end walls, or at least longitudinal sections of the flanges present in the end walls, which sections are adjacent to the flange parts parallel to the axis, also preferably form an angle of the stated type.

The metallic shells preferably consist of ferritic, rust-free or possibly non-rust-free material. A ferritic steel is usually cheaper than an austenitic steel and can also be relatively readily formed by shaping without cutting.

The shells may be produced from originally flat sheet metal pieces by shaping without cutting, for example by deep drawing or possibly another drawing or pressing method. For example, the outline shapes of the sheet metal pieces intended for shaping can be established by cutting or in another manner so that they have the intended shapes of the shells after deep drawing. Such a production process can thus also be used to produce shells by deep drawing without it being necessary to cut off edge sections or carry out other operations intended for shaping after the deep drawing process. The shells for the catalytic converter according to the invention may be produced in an economical manner in this way.

If desirable for any reason, however, parts can be cut off in one cutting operation from the workpieces formed by deep drawing, in order thus to form the shells. Since the flanges project away outwardly from the curved sections of the shells, such a cutting process which is carried out after deep drawing is much simplier and more economical than in the case of the known shells already described, which have edge sections which can be inserted one into the other.

After the production of the shells, at least one core and an intermediate layer surrounding it can be arranged between the shells. Thereafter, two shells can be pressed against one another, the angle between the flanges to be welded being reduced by the deformation of the flanges and/or of the curved shell sections. The stated deformation should be a deformation which takes place at least partially and, for example, even completely elastically. By suitably establishing the compressive force exerted on the shells when the latter are pressed against one another, it is possible to ensure that the core or cores (are) held in an optimal manner in the casing even when the cross-sectional dimensions of a core differ from the intended ideal cross-sectional dimensions.

The catalytic converter according to the invention thus both permits economical production and ensures good quality.

In the finished catalytic converter, the flanges welded to one another and forming an angle with one another may be slightly springy. If the dimensions—in particular the cross-sectional dimensions—of the metallic casing and of the or each core contained therein are changed to different extents by temperature variations, the spring action of the flanges, can help to compensate these different dimensional changes of.

BRIEF DESCRIPTION OF THE DRAWINGS

The subject of the invention is described below with reference to embodiments shown in the drawing. In the drawing.

DESCRIPTION OF THE PREFERRED EMBODIMENTS

Figure 1:
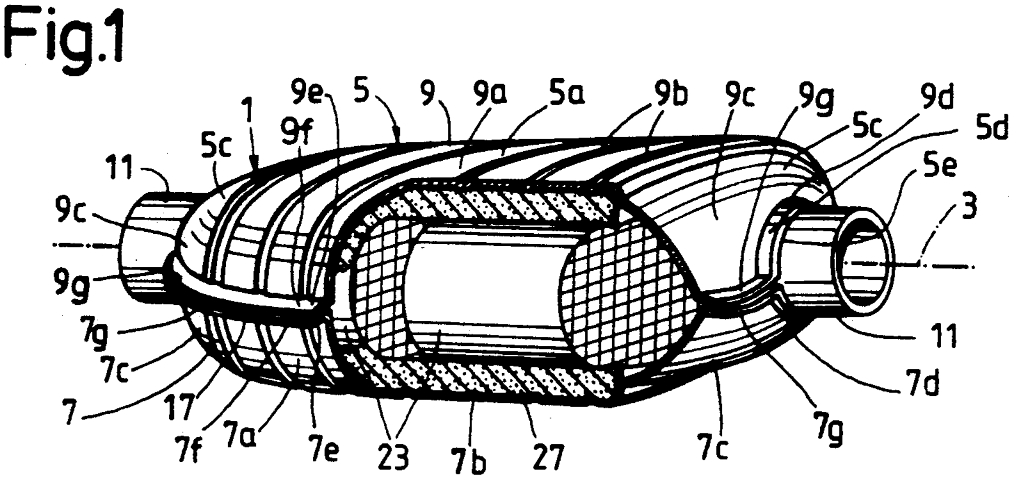
FIG. 1 shows perspective view of a catalytic converter with a cut-away casing.
Figure 2:
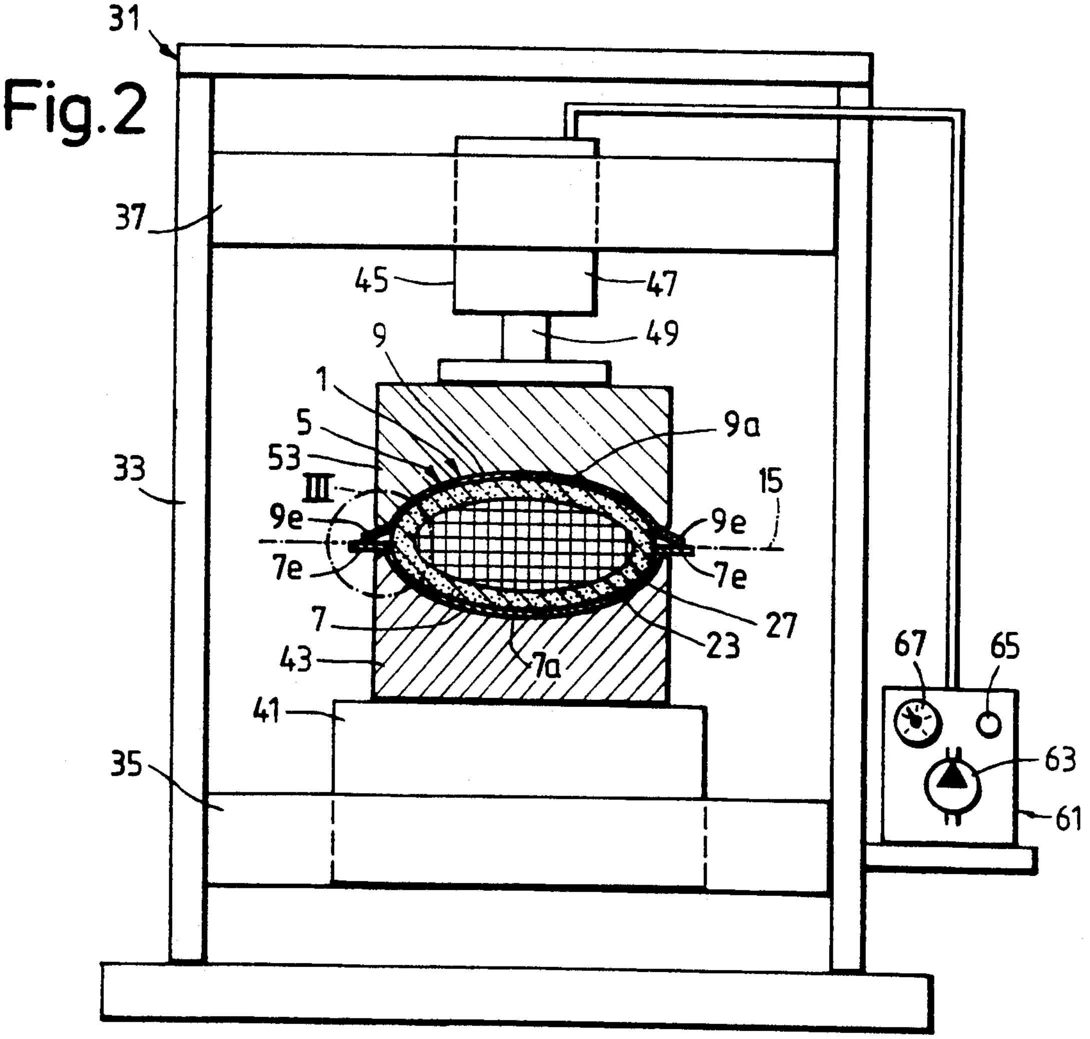
FIG. 2 shows a cross-sectional view of the catalytic converter shown in FIG. 1 and a highly schematic partially cross-sectional view of a press.
Figure 3:
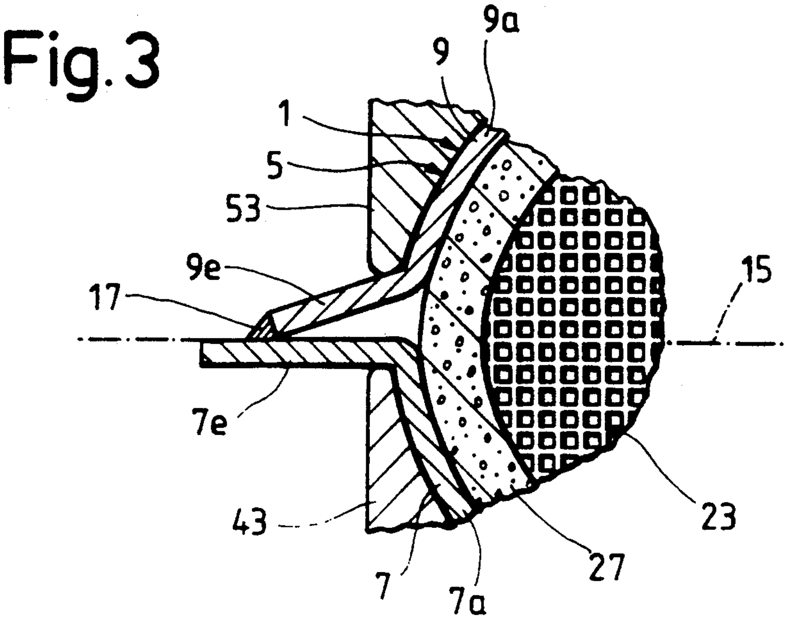
FIG. 3 shows a partial cross-sectional view, noted by III in FIG. 2, of the catalytic converter and the press tools acting on its casing.

The catalytic converter 1 shown in FIGS. 1 and 2 and partially in FIG. 3, is intended for installation in the exhaust gas pipe of an internal combustion engine, namely of a gasoline engine of a road vehicle. The catalytic converter 1 has an oblong shape and a longitudinal axis 3. The catalytic converter has a metallic, gas-tight casing 5 whose middle longitudinal section forms a lateral part or jacket 5*a*. The latter is in general, parallel to the axis 3 and cylindrical or, for example, approximately elliptical or oval in cross-section. The casing 5 has, at each of the two ends of the lateral part or jacket 5*a*, an end wall 5*c* which forms an angle with the axis 3 and approaches the axis 3 away from the ends of the lateral part 5*a*. Each end wall 5*c* has in the center a collar-like and/or nozzle-like extension 5*d*, which, for example, is cylindrical or tapers slightly conically away from the end wall 5*c* and defines a circular opening 5*e* coaxial with the axis 3.

The sections of the casing 5 described above are formed by two shells, namely a first, lower shell 7 and a second, upper shell 9. Each shell 7, 9 consists of a one-piece, metallic element, namely a sheet metal piece, and has a lateral section 7*a* or 9*a*, respectively. Two lateral sections 7*a*, 9*a* together form the generally cylindrical lateral part 5*a* of the casing 5 and are provided with beads 7*b* or 9*b*, which together in pairs are in the form of a ring around the axis 3 but form channels which of course are interrupted between the two shells and distributed over the length of the lateral part 5*a*. Each lateral section 7*a*, 9*a* forms a half-ellipse or a half-oval in cross-section, corresponding to the elliptical or oval cross-sectional shape of the lateral part 5*a*. Each shell 7, 9 is coordinated at both ends of its lateral section 7*a*, 9*a* with an end wall section 7*c* or 9*c* which is provided with an extension section 7*d* or 9*d*. The end wall section 7*c*, 9*c* and the extended section 7*d*, 9*d* of the two shells 7 or 9 form, together in pairs, one of the end walls 5*c* or one of the extensions 5*d*. That part of each shell 7 or 9 which is formed by the lateral section 7*a*, 9*a* and the two end wall sections 7*c*, 9*c* is also designated below as curved and/or vaulted main section 7*a*, 7*c* or 9*a*, 9*c* of the shell 7 or 9. Each shell 7, 9 has, on both sides of a vertical central plane extending therethrough and the axis 3, at the edges of their main section 7*a*, 7*c* or 9*a*, 9*c*, edge sections which are bent and/or curved outwardly away from the main section and which, accordingly, project away from the main section 7*a*, 7*c* or 9*a*, 9*c* and from the axis 3. The edge sections belonging to the first shell 7 form first flanges 7*e*. The edge sections belonging to the second shell 9 form second flanges 9*e*. Each flange 7*e*, 9*e* has a flange part 7*f* or 9*f* coordinated with the lateral section 7*a* or 9*a*, and two end flange parts 7*g* and 9*g* each coordinated with an end wall section 7*c* or 9*c*. Each middle flange part 7*f*, 9*f* is coordinated at each of its two ends with one of the end flange parts 7*g* and 9*g*.

The casing 5 also comprises, in addition to the two shells 7, 9, two connections, each of which consists of a separate sleeve 11 inserted into one of the openings 5*d*.

FIGS. 2 and 3 also show a plane 15 which passes through the axis 3 and between the two shells 7, 9 and, thus, in particular between the curved main sections thereof and is parallel to the edges present on the outside of the edge sections 7*e*, 9*e*. The lateral sections 7*a*, 9*a* and the end wall sections 7*c*, 9*c* in pairs have at least approximate mirror symmetry across the plane 15. The flange parts 7*f* and 9*f* coordinated with the lateral sections 7*a*, 9*a* are flat, apart from the bent and/or curved transition or connecting section connecting them to the relevant lateral section and at least before the two shells are joined to one another in the manner described. As can be seen particularly clearly in FIG. 3, each flange part 7*f* of the shell 7 is furthermore parallel to the plane 15, while each flange part 9*f* is inclined away from the lateral section 9*a* toward the plane 15 and forms an angle with the latter in the flange 7*e*. This angle is preferably at least 5° and preferably not more than 60°, and in particular not more than 45° and, for example, 10° to 25° or up to 30°. The length of the space formed between the flanges 7*e* and 9*e*, as it can be seen in FIG. 3, is substantially greater than the thickness of the shells 7 and 9.

In the relaxed, undeformed state, the end flange parts 7*g* coordinated with the end wall sections 7*c* are preferably parallel to the plane 15 along their entire length, similarly to the middle flange parts 7*f*. The end flange parts 9*g* coordinated with the end wall sections 9*c* are preferably inclined with respect to the plane 15 along their entire length by at least approximately and, for example, exactly the same angle as the middle flange parts 9*f*. Regardless of whether each collar-like and/or nozzle-like extension 5*d* formed by a pair of extension sections 7*d*, 9*d* is cylindrical or conical, the end flange parts 7*g* and 9*g* can however have a position which is slightly different compared with the remaining longitudinal regions of the end flange parts 7*g* and 9*g*, relative to the plane 15, in their longitudinal regions directly adjacent to the this case, the flange parts 7*g* may be only for the major part parallel to the plane 15 and/or the flange parts 9*g* only for the major part inclined with respect to the plane 15.

The two shells 7, 9 and the sleeves 11 consist, for example, of ferritic, stainless steel. The flanges 7*e*, 9*e* are in contact with one another in pairs along the plane 15 and are connected firmly and tightly to one another by a weld seam 17 shown only in FIG. 3. Each first flange 7*e* projects beyond the outer edge of the second flange 9*e* so that the weld seam 17 is present on that surface of the first flange 7*e* which faces the second flange 9*e*. The two sleeves 11 serving as connections are likewise connected to the two shells by weld seams.

At least one dimensionally stable core 23 is arranged in the casing 5 or, for example two cores 23 which are spaced apart from one another along the axis 3 and are separated from one another by a free intermediate space. Each core 23 consists of a relatively short cylinder having an elliptical or oval cross-sectional shape. The cross-sectional shapes of the lateral part 5*a* of the casing 5 and of the two cores 23 are matched with one another so that the lateral part 5*a* and the circumferential or lateral surfaces of the cores 23 are curved in cross-section so that they are at least approximately parallel to one another. Each core 23 has, as the main component, a one-piece, dimensionally stable carrier, namely, a ceramic element, which is also designated as a substrate and is provided with a large number of passages parallel to the axis 3. In these, a carrier layer which consists, for example, of alumina and is frequently referred to as "wash coat" and substantially increases the surface area is applied to the ceramic surface. The catalytically active layer which consists, for example, of at least one noble metal—for example platinum and/or rhodium—is then applied to this carrier layer.

The cross-sectional dimensions, i.e. the lengths of the two ellipse or oval axes of the inner surface of the lateral part 5*a* are greater than the cross-sectional dimensions, i.e. lengths of the two ellipse or oval axes, of the cores 23, so that a cavity results between the cores 23 and the inner surface of the lateral part 5*a*. An intermediate layer 27 which surrounds the circumferential or lateral surfaces of the two cores 23 in cross-section, is deformable—and in fact at least partly elastically deformable—and, according to FIG. 1, can also extend over the cavity between the two cores 23 and, for example, to a greater or lesser distance over those end faces of the two cores 23 which face away from one another is arranged in said cavity, but those regions of the interior of the casing which are adjacent to the end faces of the cores 23, and the openings 5*e*, should remain free. The intermediate layer 27 should consist of a layer-like material which is heat-resistant to the operating temperatures of the cores 23, for example of a mat which contains inorganic fibers, particles of vermiculite, an inorganic filler material and a binder, for example, an organic one. Mats of this type are obtainable under the trade name INTERAM from 3M Company. Vermiculite is a mica-like clay material which has lamellae, forms pores by evaporation of interlayer water on heating and is expanded so that the entire mat swells on heating.

A press 31, which serves for pressing the two shells 7, 9 against one another in the production of the catalytic converter 1 in the manner described and which is shown schematically in FIG. 2, has a frame 33 which holds a lower support 35 and an upper support 37. Preferably at least the upper support and, for example, also the lower support are held on the frame in such a way that their height is adjustable. The lower support 35 holds a lower press tool 43 over a vibration apparatus 41. A compressive force generator 45 has at least one hydraulic cylinder 47 fastened to the upper support 37 and a piston 49, on whose shaft the upper press tool 53 is fastened.

The two press tools 43, 53, which are also partly visible in FIG. 3, each have a trough-like recess into which the curved main section of the shell 7 or of the shell 9 fits. The two tools 43, 53 are formed in such a way that at least the free edges of the flange 7*e* and 9*e* of the shells project between the tools, and the two shells 7, 9 are pressed against one another. The vibration apparatus 41 is formed in order to oscillate the lower press tool 43 and has, for example, a vibrator which is held on the support 41 by a vibration-damping connecting means and acts on tool 43 and which has, for example, a motor, at least one crank rotatable by the motor and a connecting rod which converts these rotary movements into oscillating movements, or may be in the form of a magnetic vibrator or in some other form. Since the vibrations generated by the vibration apparatus 41 can be transmitted to the upper press tool 53 via the two shells 7, 9 when the latter are being pressed against one another, the connecting means connecting said tool with the piston 49 and/or the connecting means connecting the cylinder 47 to the support 37 are preferably likewise vibration-damping.

The hydraulic cylinder 47 is connected to a fluid source 61 via at least one pipe which serves for cleaning and removing the hydraulic fluid. This fluid source has a reservoir, not shown, for the hydraulic liquid, a manually and/or electrically drivable pump 63 and measuring and control means in order to fix the maximum value of the pressure of the hydraulic fluid fed to the hydraulic cylinder 47 and hence also the maximum value of the compressive force generated by said fluid when the press is used. The measuring and control means may have, for example, manually operable switching and/or adjusting elements for controlling the pump 63 and a manually adjustable adjusting element 65 which serves for setting this maximum value of the compressive force. The measuring and control means furthermore have a measuring and indicating device 67 to show the instantaneous pressure of the hydraulic fluid fed to the hydraulic cylinder and/or directly to indicate the compressive force generated by the compressive force generator. In a simple embodiment of the press, the adjusting element 65 may be formed, for example, by an adjustable pressure relief valve. In a press intended for mass production, the hydraulic compressive force generator 47 may be, for example, alternatively manually or automatically controllable. For this purpose, the measuring and control means may have a pressure transducer and a regulating apparatus, which, for example, is provided with a process computer. In this case, the adjusting element 65 may be formed by a setpoint adjuster connected to the regulating apparatus. The regulating apparatus can then control the pump 63 and/or at least one electrically or pneumatically controllable valve in such a way that the maximum value of the compressive force exerted by the press on the shells is approximately or exactly equal to the set setpoint value. The press may furthermore be formed in order to move the upper process tool 53 at different speeds in different work phases. The tool 53 is at a distance above the upper shell at the beginning of a pressing operation can, for example, be moved downward along a distance rapidly and with virtually little force until the upper shell 9 has been reached, and slowly but with a relatively great force after the upper shell has been reached. Lifting of the tool 53 can then once again be effected at a relatively high speed.

In the production of a catalytic converter 1, its cores 23, shells 7, 9 and sleeves 11 are first produced. The two shells 7, 9 are formed by cutting them out from flat sheet metal pieces and subsequently shaping—namely deep drawing—said pieces. To assemble the catalytic converter, the two cores 23 are surrounded by a flexible mat which serves to form intermediate layers 27 and are arranged between the two shells 7, 9. These are in turn arranged between the two press tools still a distance apart. The intermediate layer 27 or—more precisely—the vermiculite present therein is still in the unexpanded, unswelled state. The upper press tool 53 is now moved downward and presses the shell 9 against the shell 7 with a compressive force generated by the hydraulic compressive force generator 45. When the two shells are pressed against one another, the vibration apparatus 41 oscillates the lower press tool 43, and the catalytic converter thereon, so that the cores 23 and the intermediate layer 27 reach the positions optimally adapted to the shapes of the shells.

The intermediate layer 27 is compressed with, for example, at least partial elastic deformation when the two shells 7, 9 are pressed against one another. Furthermore, when the two shells 7, 9 are pressed against one another, the flanges 9*e* and possibly also the flanges 7*e* undergo slight elastic and possibly also plastic deformation over the major parts of their lengths and, for example, over their entire lengths. In addition, the curved main sections of the shells may also undergo a slight deformation. While the two shells are being pressed against one another, the deformations of the intermediate layer 27 and of the shells generate a counter-force which increases in the course of the pressing operation and has to be overcome by the compressive force generated by the press.

As mentioned in the introduction, during mass production, the ceramic elements of the cores 23 may have shapes and dimensions differing from the intended ideal shapes and/or ideal dimensions. Otherwise, the shapes and dimensions of the shells may also differ slightly from the intended ideal shapes and ideal dimensions, but these differences are usually substantially smaller in the case of the shells than in the case of the ceramic elements. By means of a few tests carried out before mass production, it is possible to determine an optimal value for the compressive force, by means of which the two shells 7, 9 are pressed against one another at the end of the pressing operation and during the welding operation. The measuring and control means of the fluid source 61 then permit the two shells to be pressed against one another at least approximately or exactly with the same, optimal compressive force for all catalytic converters of the same type during mass production of catalytic converter. Regardless of the shape and the dimensions of the catalytic converter, this optimal compressive force may be, for example, at least 50N and not more than about 500N.

The process computer of the regulating apparatus may, however, be formed so that it would vary the maximum value of the compressive force as a function of at least one parameter within a certain, relatively small range. Such a parameter may be, for example, the height at which the upper press tool 53 reaches the upper shell during lowering and begins to press the two shells against one another.

If the two shells 7, 9 are pressed against one another with the intended compressive force, their flanges 7*e*, 9*e* are welded to one another in pairs. The two shells are pressed against one another with a constant compressive force during the entire welding operation. For welding, an additional material is used with a welding wire into the fillet formed by the upper surface of the first, lower flange 7*e*, and the free edge of the upper, second flange 9*e*. A gas-shielded arc welding unit is preferably used for the welding operation. The plane 15 then passes through the weld seam 17 formed during welding. In order to ensure that the openings 5*e* acquire the intended diameters when the shells 7, 9 are pressed against one another, calibration pegs may be temporarily arranged in the openings 5*e* before and during the operation of pressing together. When the calibration pegs are removed again, the two sleeves 11 can be inserted into the openings 5*e* and likewise welded to the shells before, during or after welding of the flanges.

After the shells 7, 9 have been welded to one another and to the sleeves 11, the upper press tool 53 is drawn upward away from the lower press tool 43, and the catalytic converter 1 is removed from the press 31. The catalytic converter can then be heated either in a special heating operation or during its first use by the hot exhaust gas flowing through it, and the heat generated in the catalytic converter by chemical reactions of the exhaust gas, so that the vermiculite contained in the intermediate layer 27 and, hence, the entire intermediate layer swells and then remains swollen and elastically deformable even at normal ambient temperatures.

For the sake of greater clarity, the intermediate layer 27 is shown in FIGS. 2 and 3 in its shape assumed in the original, pressureless state, so that a free cavity is present between those surfaces of two flanges 7*e*, 9*e* which face one another. In reality, however, the intermediate layer 27, which is both elastically and plastically deformable, is pressed into the cavities present between the flanges when the shells are being pressed against one another and completely fills these cavities no later than after the swelling process. In the finished catalytic converter, the intermediate layer 27 therefore tightly seals the cavities, which are present between the flanges in the lengthwise regions of the cores 23. The intermediate layer also tightly seals all other cavities between the inner surfaces of the lateral part 5*a* of the casing 5 and the lateral surfaces of the cores 23, so that the total exhaust gas fed to the catalytic converter during its use flows through the passages of the core 23.

Figure 5:
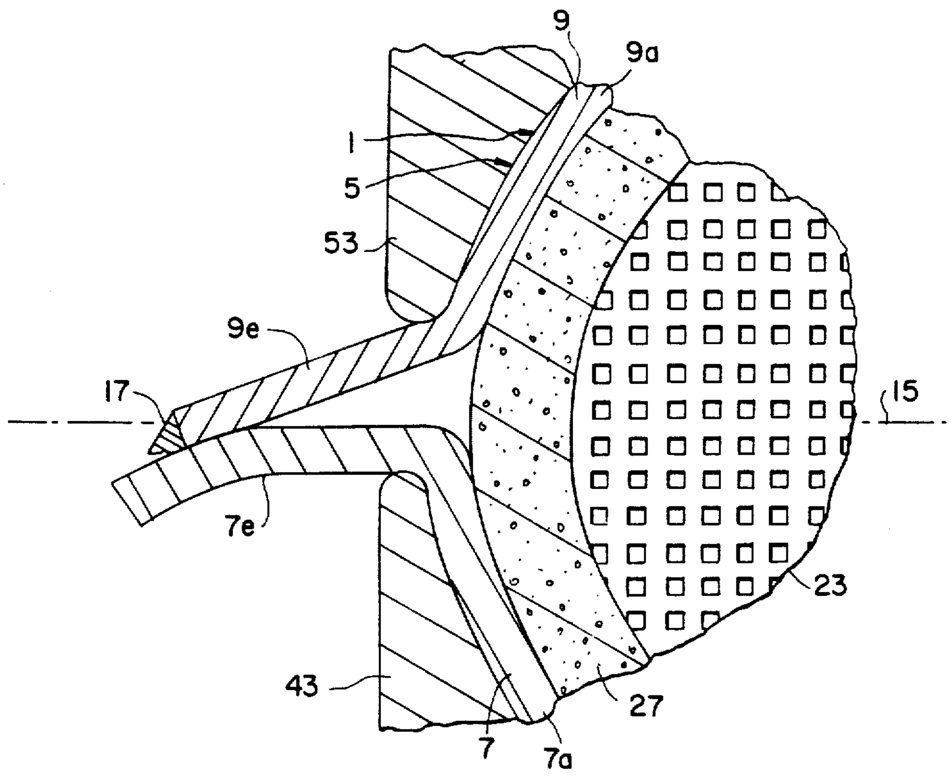
FIG. 5 shows a view similar to that of FIG. 3 of yet another embodiment of a catalytic converter.

Regarding the first flanges 7*e*, it may furthermore be noted that they are shown in FIGS. 1 to 3 in their shape assumed in the original state, and parallel to the plane 15. As already mentioned, the flanges 7*e* may also be slightly deformed when the shells are pressed against one another. Whether such a deformation takes place depends, inter alia, on the shape of the press tools. If this is the case, shape of the press tools. If this is the case, at least the outer edge regions of the first flanges in FIGS. 1 to 3 may be curved slightly downward away from the plane 15, as shown in FIG. 5.

As a result of swelling of the intermediate layer 27, the compressive forces exerted by this layer on the inner surfaces of the shells 7, 9 and on the cores 23 does of course become greater than the compressive force exerted on the two shells when the latter are pressed against one another, the compressive forces exerted by the intermediate layer until the latter has swelled being, however, related to the compressive force exerted on the shells when the latter are being pressed against one another. By optimally determining, in the manner described, the compressive force with which the shells can be pressed against one another, it is therefore possible to ensure that, even in the case of relatively great deviations of their shapes and/or dimensions from the intended ideal shapes or ideal dimensions, the cores 23 are not exposed to excessive compressive forces either during production or during use of the catalytic converter and held firmly and are slightly elastically by the intermediate layer 27 in the casing 5 during operation of the catalytic converter in a motor vehicle. The intermediate layer damps the vibrations produced by the internal combustion engine and by driving a vehicle during use of the catalytic converter and can also compensate the different dimensional changes of the cores consisting mainly of ceramic and of the metallic casing, caused by heating and cooling during operation of the catalyst. It may also be possible for the flanges 7*e*, 9*e* to contribute, by a certain spring action, to vibration damping and to compensation of the dimensional changes caused by temperature fluctuations.

Figure 4:
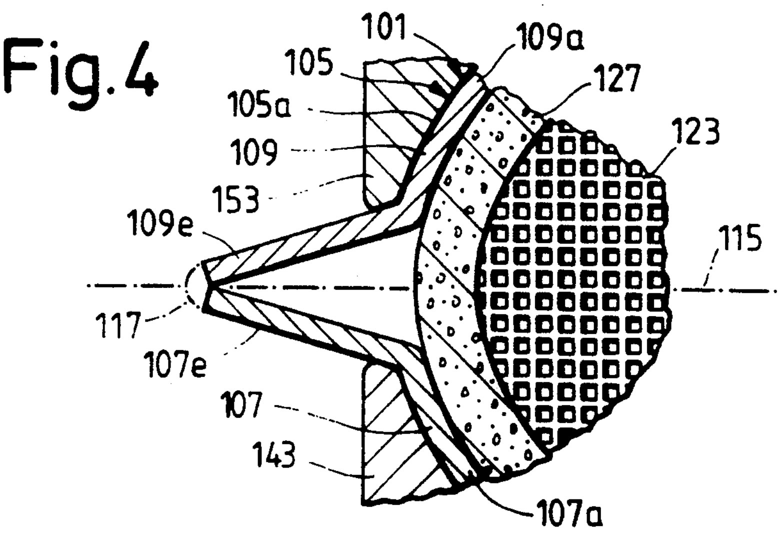
FIG. 4 shows a view similar to that of FIG. 3 of another catalytic converter and the press tools acting on its casing.

The catalytic converter 101 shown partly in FIG. 4 has a casing 105 with a lateral part 105*a*. The casing 105 has a one-piece shell 107 and a one-piece shell 109. Each shell 107, 109 has a curved main section with a lateral section 107*a* or 109*a* and two end wall sections, which are not shown. The two lateral sections 107*a*, 109*a* together form the lateral part 105*a* of the casing 105. The end wall sections of the shell 107 or 109, which are not shown in FIGS. 4, and correspond to the end wall sections 7*c* and 9*c* and together in pairs form an end wall. The main sections of the shell are coordinated at their edges with flanges 107*e* and 109*e*. The two shells 107, 109 are symmetrical with respect to a plane 115 passing between them. In particular, the flanges 107*e*, 109*e* are symmetrical to one another in pairs and in fact are inclined toward the plane 115 in the same way as the flanges 9*e* are inclined toward the plane 15, at least for the major part—i.e. over their entire length or with the exception of the end regions which are coordinated with those extension sections of the shells 107 or 109 which correspond to the extension sections 7*d* and 9*d*. The angle formed by the flanges 107*e*, 109*e* with the plane 115 may be equal to the angle formed by the flange 9*e* with the plane 115 and may be not more than 60°or up to no more than 45°. As in FIG. 3, the length of the space between the flanges 107*e* and 109*e* is substantially greater than the thickness of the flanges. Since, in the embodiment of catalytic converter shown in FIG. 4, both flanges 107*e*, 109*e* are inclined toward the plane 115, the angle between the two flanges 107*e*, 109*e* may then be up to 120° or up to 90°. In most cases, however, it is probably sufficient if the angle made by the two flanges is acute not more than 60° or even only 45° at the most. The flanges 107*e*, 109*e* may then accordingly form an angle of not more than 30° or even only 22.5°, at the most, with the plane 115. Those flanges of the two shells 107, 109 which are in contact with one another in the finished catalytic converter 101 along the plane 115 are firmly and tightly joined to one another at their edges by weld seams 117, which can be produced alternatively with or without the use of an additional material by gas-shielded arc welding. The catalyst 101 has at least one core 123 surrounded by an intermediate layer 127, and—unless otherwise stated above—is identical or similar to the catalytic converter 1. The catalytic converter 101 is also produced in a similar manner to the catalytic converter 1. For welding, in particular the shells 107, 109 are pressed against one another by two press tools 143, 153.

In the case of the catalytic converter 1 and 101, the flanges which are elastically deformed to a greater or lesser extent, when the shells 7, 9, 107, 109 are being pressed against one another, may spring back slightly after the catalytic converter have been removed from the press—possibly depending to some extent on how the welding is carried out. This springing back can be taken into account and to a certain extent compensated beforehand by appropriately increasing the compressive force when the shells are being pressed against one another, so that the shells in the finished catalytic converter 1, 101 exert compressive forces of the desired magnitudes on the cores.

The catalytic converter and the processes for their production may furthermore be modified in various ways. The lateral part of the casing may, for example, in general be cylindrical or have, in cross-section, two straight sections parallel to one another and two arcs connecting the ends thereof to one another. Furthermore, instead of the short, cylindrical sleeves 11 serving as connections, any straight or curved pipes of the exhaust gas pipe may be welded to the two shells of the casing.

The catalytic converter 1 can be altered so that each shell has a flange parallel to the plane 15 on one side of a vertical central plane passing through the axis 3 and at right angles to the plane 15, and has a flange inclined with respect to the central plane 15 on the other side of said vertical plane.

In the lengthwise sections, the end walls, instead of being curved, may be partly or even completely flat, and at right angles to the axis of the catalytic converter.

Furthermore, the catalytic can, if necessary, be provided with inner and outer casings to improve the heat insulation and/or sound insulation. Each of these casings may then have a lateral part and two end walls and may be formed by two shells. The four shells may have, for example, flanges formed similarly to the shells 7, 9, 107, 109, and the flanges of the inner shells may project outwardly by approximately the same distance as those of the outer shells, so that, at each edge, four flanges belonging to different shells can be welded to one another. However, it would also be possible for the outer housing to enclose the inner housing together with its flanges.

Moreover, the core or the cores catalyst converter may have, instead of a ceramic element, an element which consists of another material, for example a metallic one, which defines passages for the exhaust gas and serves as a carrier for the catalytically active layer.

Instead of being formed from at least one vermiculite-containing mat, the intermediate layers present between the metallic shells and the cores may be formed from at least one layer or covering which consists of at least one other material heat-resistant up to the operating temperatures of the cores and, thus, up to at least 750° C. and, preferably, up to at least 950° C., and which is deformable—and preferably at least partly elastically deformable. The individual layers can, for example, be formed at least partly of metallic material, for example of an alloy containing nickel as the main component and furthermore chromium, iron and cobalt and known under the trade name Inconel, or of steel. The metallic intermediate layers may have, for example, at least one wire mesh or knitted wire fabric or tape or sheet or at least one other part, and the metallic material may be porous or foam-like. Furthermore, the intermediate layers may contain another, fibrous and/or porous mineral instead of vermiculite.

Instead of temporarily arranging calibration pegs in the openings of the casing when the shells are being pressed against one another, it may be possible, before the shells are pressed against one another, to insert the sleeves serving to form connections or even connecting pipes into the openings to be formed.

Furthermore, the compressive force generator 45 of the press may have at least one pneumatic cylinder instead of at least one hydraulic cylinder. The fluid source 61 would in this case be in the form of a compressed air source. It might also be possible to provide a press whose compressive force generator has an electric motor and a threaded spindle which can be rotated by this motor.

What is claimed is:

1. A catalytic converter for treatment of exhaust gases, said catalytic converter comprising a casing including first and second one-piece metallic shells having each a curved main section, and first and second flanges which project outwardly away from the respective main sections of the first and second shells, wherein each respective pair of the first and second flanges is welded along a weld seam formed at a location remote from the main sections, and wherein the first and second flanges of each respective pair of the first and second flanges, when viewed in a cross-section taken transverse to the weld seam, extend, at least along a substantial portion of a common length thereof, at an acute angle to each other and approach each other at the weld seam so as to form a space therebetween reducible upon application of a deforming force to at least one of the first and second shells for pressing the first and second shells toward each other.

2. The catalytic converter of claim 1, wherein the first flange of each respective pair of first and second flanges extends, at least along a substantial portion of a length thereof, parallel to a plane extending between the main sections of the first and second shells, and the second flange of the respective pair extends at an angle to the plane.

3. The catalytic converter of claim 2, wherein the first flange extends beyond the edge of the second flange.

4. The catalytic converter of claim 3, wherein the first and second flanges are substantially flat.

5. The catalytic converter of claim 3, wherein the space between respective first and second flanges has a length which, when measured in a direction transverse to a corresponding weld seam, is substantially greater than a thickness of the shells.

6. The catalytic converter of claim 2, wherein the first and second flanges are substantially flat.

7. The catalytic converter of claim 2, wherein the space between respective first and second flanges has a length which, when measured in a direction transverse to a corresponding weld seam, is substantially greater than a thickness of the shells.

8. The catalytic converter of claim 1, wherein each of the first and second flanges of each respective pair of first and second flanges is inclined, at least along a substantial portion of a length thereof, outwardly away from a plane extending between the main sections of the first and second shells.

9. The catalytic converter of claim 8, wherein the first and second flanges are substantially flat.

10. The catalytic converter of claim 1, wherein the angle is at least 5° and not more than 60°.

11. The catalytic converter of claim 10, wherein the angle is from 10° to 45°.

12. The catalytic converter of claim 1, wherein the casing has opposite openings for receiving the exhaust gas and for removing it away, the catalytic converter further comprising at least one core located between the opposite openings and having passages for the exhaust gas, and a deformable intermediate layer arranged between inner surfaces of the first and second shells and the at least one core.

13. The catalytic converter of claim 12, wherein the intermediate layer contains one of a porous material, which is expandable by heating, and an expanded mineral.

14. The catalytic converter of claim 12, wherein at least those parts of each second flange, which extend over the length of the at least one core, extend at said angle to a respective first flange.

15. The catalytic converter of claim 1, wherein said first and second flanges each have a middle flange part, wherein the middle flange parts extend at said angle to each other.

16. The catalytic converter of claim 1, wherein the casing has an axis, and the first and second flanges of each respective pair of first and second flanges have middle flange parts extending along the axis and end flange parts connected to ends of the middle flange parts, and wherein the middle flange parts extend parallel to the axis, and the end flange parts extend at said angle to each other.

17. The catalytic converter of claim 1, wherein the casing has opposite openings for receiving the exhaust gas and for removing it away, and the catalytic converter further comprises at least one core located between the opposite openings and having passages for the exhaust gas, and a deformable intermediate layer arranged between inner surfaces of the first and second shells and the at least one core, wherein the casing has an axis extending through the opposite openings and each of the first and second flanges has a middle flange part and an end flange part approaching the axis, and wherein middle flange parts of respective second flanges, which extend at least over a longitudinal extent of the at least one core, and portions of respective end flange parts which are contiguous with said middle flange parts are inclined toward a plane extending between the first and second shells.

18. The catalytic converter of claim 1, wherein the casing has opposite openings for receiving the exhaust gas and for removing it away, the catalytic converter further comprising at least one core located between the opposite openings and having passages for the exhaust gas, and a deformable intermediate layer arranged between inner surfaces of the first and second shells and the at least one core, wherein each of first and second flanges of each respective pair of flanges has a middle flange part extending along a longitudinal extent of the at least one core and an end flange part connected to the middle flange part at an end of the middle flange part, and wherein the middle flange parts of respective parts of flanges and portion of the end flange parts, which are contiguous with the middle flange parts, are inclined toward a plane extending between the first and second shells.

19. The catalytic converter of claim 1, wherein the first and second flanges are substantially flat.

20. The catalytic converter of claim 1, wherein the space between respective first and second flanges has a length which, when measured in a direction transverse to a corresponding weld seam, is substantially greater than a thickness of the shells.

21. A catalytic converter for treatment of exhaust gases, said catalytic converter comprising:

a casing having opposite openings for receiving the exhaust gas and for removing it away and including first and second one-piece metallic shells having each a curved main section, and first and second flanges which project outwardly away from the respective main sections of the first and second shells, each respective pair of the first and second flanges being welded along a weld seam formed at a location remote from the main sections;

at least one core located between the opposite openings and having passages for the exhaust gas; and a deformable intermediate layer arranged between inner surfaces of the first and second shells and the at least one core;

wherein each of the first and second flanges, when viewed in a cross-section taken transversely to a respective weld seam, has a middle flange part, and wherein middle flange parts of respective pairs of first and second flanges extend, at least along a substantial portion of a common length thereof and at least over a longitudinal extent of the at least one core, at an angle to each other, and respective first and second flanges approach each other at respective weld seams so that a space is formed between each pair of respective middle flange parts which can be reduced upon application of a deforming force to at least one of the first and second shells for pressing the first and second shells toward each other.

22. The catalytic converter of claim 21, wherein the casing has an axis extending through the opposite openings, wherein each of the first and second flanges has an end flange part connected to an end of the middle flange part and approaching the axis, and wherein at least portions of end flange parts, which are contiguous with respective middle flange parts of respective pairs of first and second flanges, extend at said angle to each other.

23. A catalytic converter for treatment of exhaust gases, said catalytic converter comprising a casing including first and second one-piece metallic shells having each a curved main section, and first and second flanges which project outwardly away from the respective main sections of the first and second shells, wherein each respective pair of the first and second flanges is welded along a weld seam formed at a location remote from the main sections, wherein the first flange of each respective pair of flanges extends, when viewed in a cross-section taken transversely to the weld seam, at least along a major part of a length thereof, substantially parallel to a plane extending between the main sections of the first and second flanges, and is inclined outwardly away from the plane toward an outer edge thereof, and wherein the second flange of each respective pair of flanges is inclined, at least along a major part of a length thereof, relative to the plane and approaches the first flange at a respective weld seam so as to form a space therebetween which can be reduced upon application of a deforming force to at least one of the first and second shells for pressing the first and second shells toward each other.

24. A catalytic converter for treatment of exhaust gases, said catalytic converter comprising a casing including first and second one-piece metallic shell having each a curved main section, and first and second flanges which project outwardly away from the respective main sections of the first and second shells, wherein each respective pair of the first and second flanges is welded along a weld seam formed at a location remote from the main sections, and wherein first and second flanges of all pairs of flanges are inclined toward a plane extending between the main sections of the first and second shells and approach one another at respective weld seams so that a space is formed between each pair of first and second flanges which can be reduced upon application of a deforming force to at least one of the first and second shells for pressing the first and second shells toward each other.

* * * * *

UNITED STATES PATENT AND TRADEMARK OFFICE

CERTIFICATE OF CORRECTION

PATENT NO. : 5,273,724

DATED : Dec. 28, 1993

INVENTOR(S) : Karel Bos

It is certified that error appears in the above-indentified patent and that said Letters Patent is hereby corrected as shown below:

On title page, "24 Claims, 2 Drawing Sheets" should read --24 Claims, 3 Drawing Sheets--

The drawing sheet, consisting of Fig. 5, should be added as shown on the attached page.

Signed and Sealed this

Nineteenth Day of July, 1994

Attest:

BRUCE LEHMAN

*Attesting Officer*

*Commissioner of Patents and Trademarks*